United States Patent [19]

Alvis et al.

[11] Patent Number: 4,582,169
[45] Date of Patent: Apr. 15, 1986

[54] GREASE PACKER FOR BEARINGS

[75] Inventors: Darrel M. Alvis, Chandler; Robert S. Fella, Evansville, both of Ind.

[73] Assignee: Sunbeam Plastics Corporation, Evansville, Ind.

[21] Appl. No.: 654,978

[22] Filed: Sep. 27, 1984

[51] Int. Cl.$^4$ ............................................. F16C 1/24
[52] U.S. Cl. ................................ 184/5.1; 184/105.3
[58] Field of Search ............. 184/5.1, 105 R, 105 A, 184/105 B, 105 C; 384/93

[56] References Cited

U.S. PATENT DOCUMENTS

| | | | |
|---|---|---|---|
| 2,699,839 | 1/1955 | Hamel | 184/5.1 |
| 2,839,160 | 6/1958 | Wright | 184/5.1 |
| 3,098,541 | 7/1963 | Kadas | 184/5.1 |
| 3,365,024 | 1/1968 | Freda | 184/5.1 |
| 3,724,596 | 4/1973 | Freda | 184/5.1 |
| 4,106,816 | 8/1978 | August | 184/5.1 |
| 4,113,059 | 9/1978 | Markovski | 184/5.1 |

*Primary Examiner*—Carlton R. Croyle
*Assistant Examiner*—Jeffrey A. Simenauer
*Attorney, Agent, or Firm*—Fisher, Crampton, Groh and McGuire

[57] ABSTRACT

An apparatus for dispensing grease into a plurality of bearing assemblies without waste and includes a base member equipped with at least one grease channel, a vertical support member adjustably supported on the base member, a stacking rod mounted on the base for stacking the bearing assemblies to be greased and a retaining means carried by the stacking rod to hold the stacked bearings in tight stacking alignment with each other. The bearings are placed in a vertical stacked relationship on the stacking rod and held in tight relationship to each other by the retaining means. Grease is applied through the grease channel, and the only path for the grease to travel is through the bearings around the inner and outer races of the bearings whereby the grease fills each bearing assembly completely before flowing up to the next bearing assembly.

11 Claims, 4 Drawing Figures

GREASE PACKER FOR BEARINGS

This invention relates to a grease packing apparatus for use with bearing assemblies having inner and outer races whereby a plurality of bearing assemblies may be greased simultaneously without waste and without the need for complex machinery or other apparati to force the grease into the bearings completely.

The prior art contemplates the use of various complex devices to lubricate a single bearing assembly at a time. Moreover, none of the known prior art contemplates the lubrication of a plurality of bearing assemblies at the same time on so simple a device. Thus, the present invention is a departure from and an improvement over the prior art.

This invention relates to a portable grease packer useful in greasing a plurality of bearing assemblies having inner and outer races. The apparatus of the present invention is comprised of a base member having a vertical support member slidably mounted thereto and a stacking rod in close proximity to the vertical support member whereby the vertical support member may be moved into engagement with any number of bearing means stacked on the stacking means to hold them in place so as to facilitate the greasing of the bearings. The base of the apparatus is equipped with a plurality of grease channels fitted with alemite grease fittings to facilitate the introduction of grease into the bearing assemblies. A bearing retaining means is provided and used with the stacking means to hold the bearing assemblies in tight facing engagement with each other so as to preclude the oozing of grease from between each bearing assembly during application of the grease. The grease is introduced through the grease channel into the bearing assemblies and flows around each bearing within the assembly through its inner and outer races completely filling each bearing assembly before proceeding to the next stacked bearing assembly. The procedure is completed when grease is seen to exude from the upper most bearing assembly.

Figure 1:
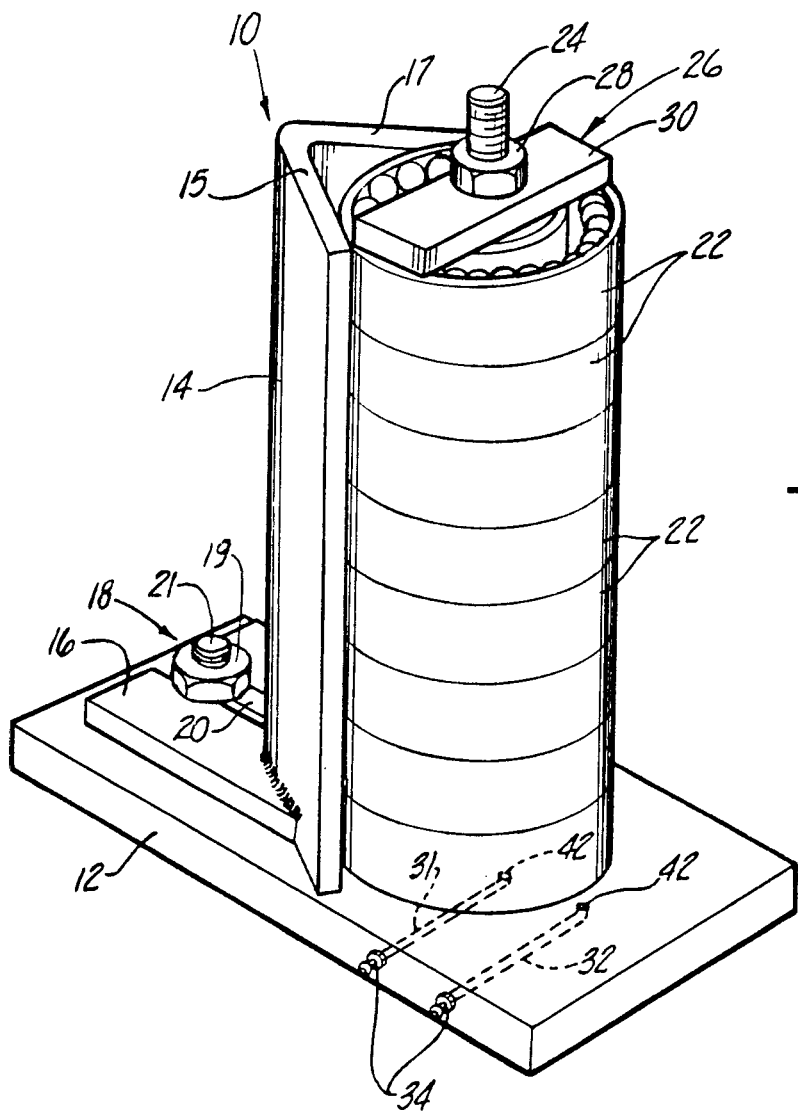
FIG. 1 is a perspective view of the grease packing apparatus of the present invention.

FIG. 1 shows a grease packing apparatus 10 comprised of a base 12 having a vertical guide or support member 14 adjustable mounted thereon. Vertical support member 14 is preferably an angle iron having walls 15 and 17 at right angles to each other and welded to a base member 10 having a centrally located slot 20. Mounting means 18 is provided to secure vertical support base in the desired position by engaging slot 20 at a selected position. The mounting means 18 includes a nut 19 threaded onto a stud 21 fixed in the base 12. By loosening nut 19, the vertical support member 14 may be moved radially, toward or away from a stacking rod 24 on which a plurality of bearing assemblies 22 are stacked.

The stacking rod 24 preferably is threaded along its entire length and threaded into the base 12. Retaining means 26 is provided to clamp bearings 22 in tight engagement against one another. The retaining means 26 includes a nut 28 and a retaining plate 30. Retaining plate 30 is of sufficient length to span the diameter of the bearing assemblies 22 so that by tightening the nut 28, the retaining plate 30 forces the casing of the bearing assemblies against one another.

Figure 2:
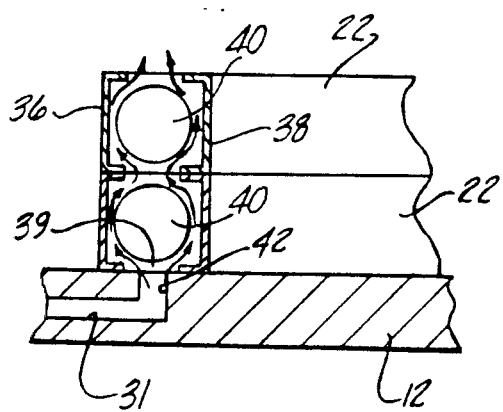
FIG. 2 is a sectional cross view of the bearing assembly showing the pathway of the grease.

The base 12 of the apparatus of the present invention is further equipped with inner and outer grease channels 31 and 32, respectively. Each grease channel 31 and 32 is equipped with an alemite grease fitting 34 to facilitate the introduction of lubricating grease under the proper pressure conditions. It should be noted that although only two such passages are shown, it is contemplated that a plurality of such grease passages could be used to accommodate bearings 27 of different diameters. Each grease channel 31 and 32 terminates in an aperture or dispensing port 42 which coincides with a passage 39, as seen in FIG. 2, formed between the inner and outer races of the bearing assemblies 22 to form a grease flow path. The apparatus may be constructed of any size, and is contemplated for use with a wide range of bearing assemblies.

As seen in FIG. 2, bearing assemblies 22 include outer races or casings 36 and inner races or casings 38 within which ball bearings 40 are disposed. Grease is introduced into pathway 39 and flows between the inner and outer races 36 and 38 of the bearing assembly. When the grease has completely filled the inner and outer races of the entire bearing assembly 22, it passes to the next ball bearing assembly 22 and repeats the procedure whereby grease flows between the inner and outer races throughout the entire stack of bearings. The engagement of the faces of the outer races 36 with those of the adjacent bearings effectively precludes the oozing of lubricating grease fluid from between the alternating stacks of bearing assemblies.

Figure 3:
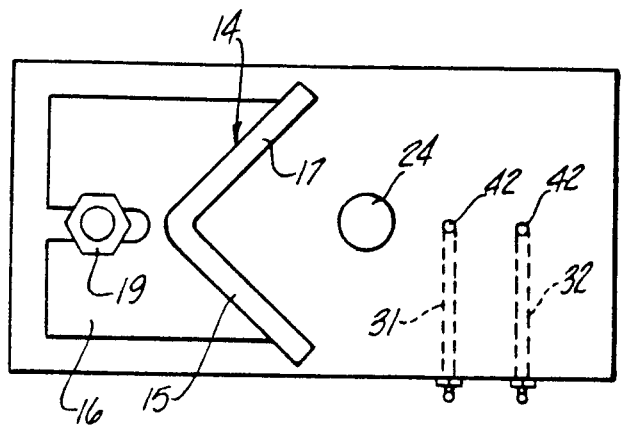
FIG. 3 is a top view of the grease packing apparatus of the present invention.
Figure 4:
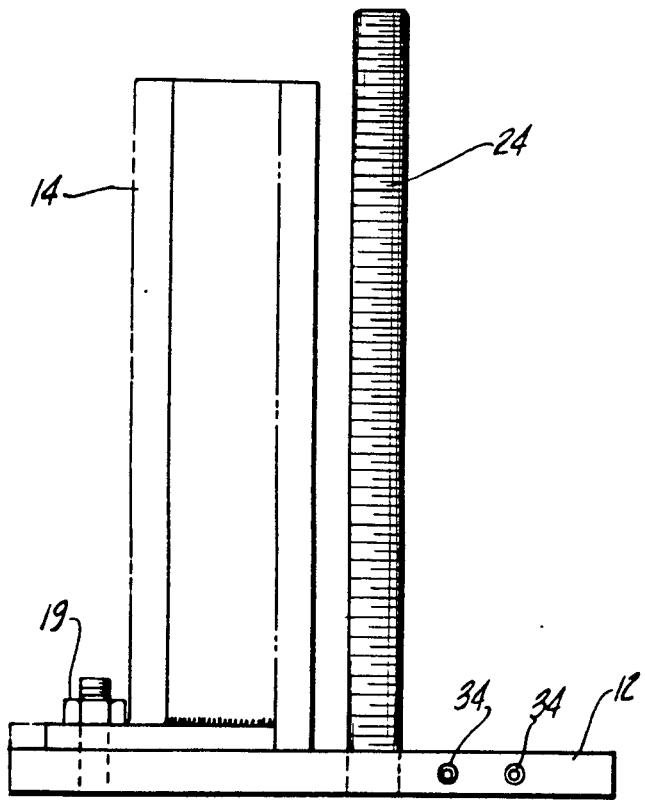
FIG. 4 is a side view of the grease packing apparatus of the present invention showing the movement of the vertical support member relative to the stacking member.

FIG. 3 shows a top view of the grease packing apparatus of the present invention illustrating the orientation of the stacking rod 24 relative to the verticle support or guide member and the grease channels 31 and 32. The stacking rod 24 is mounted on the base 12 of the assembly in a centrally located position relative to the radially spaced vertical support member. By loosening nut 19, the vertical support member 14 may be positioned towards or away from the stacking rod 24 to accommodate bearing assemblies of different diameters.

In operation, bearing assemblies of the same diameter are stacked upon the stacking rod 24 with spaced points on the circumference in contact with walls 15 and 17 of guide 14. Thereafter, the retaining plate 30 is secured in place by the nut 28. When the bearings 22 are in this position, the lips of each individual bearing casing are drawn into tight face to face engagement with those of the adjacent bearings so that when grease flows through the bearings, it will not ooze out of the sides of the stacked bearing assemblies, thereby precluding wasted lubricating fluid. The grease is introduced through the grease fittings 34 and whichever grease channel is suitable, passes through pathway 39 along the inner and outer races throughout each bearing assembly until the entire stack is lubricated. The operator knows that the operation is completed when he observes grease exuding from the upper-most bearing assembly 22.

Various modifications may be made by those skilled in the art without departing from the scope and spirit of the present invention.

The embodiments of the invention in which an exclusive property or privilege is claimed are defined as follows:

1. Apparatus for applying grease to bearings having inner and outer races comprising: a base member; a guide member mounted on said base having wall means contacting the circumference of a plurality of identical bearings to maintain said bearings in an aligned stack on an axis normal to said base, said guide member being movable on said base to accommodate different sized identical bearings aligned on said base; a clamping arrangement for holding said stack of aligned bearing in abutting contact with each other on said base member; a grease path formed in said base and having a discharge port in said base communicating with a location between the races of the bearing in said stack in contact with said base; and means for forcing grease into said grease path and through the bearings held in abutment with each other in said stack.

2. The apparatus of claim 1 wherein said clamping arrangement includes a threaded rod having one end engaged in said base member and passing through the inner race of bearings in said stack.

3. An apparatus for dispensing grease into a plurality of bearing assemblies having inner and outer races, said apparatus comprising: a base member, said base member being equipped with at least one grease channel, a vertical support member slidably mounted on said base member for adjustment to accommodate a wide range of bearing assembly sizes, a stacking rod mounted on said base for stacking said bearings to be greased, and retaining means carried by said stacking rod to hold the stacked bearings in tight abutting alignment with each other, whereby the bearings are placed in a vertical stacked relationship on the stacking rod and held in tight relationship to each other by the retaining means, grease is applied through the grease channels, the only path for the grease to travel is around the bearings inner and outer races whereby the grease fills each bearing assembly completely before traveling up to the next bearing.

4. The apparatus of claim 3 wherein said base is equipped with a plurality of grease channels whereby a plurality of different sized bearings may be greased.

5. The apparatus of claim 3 wherein said grease channel is equipped with a grease fitting to facilitate the introduction of grease into the bearing assemblies.

6. The apparatus of claim 3 wherein said vertical support includes walls disposed at an agle to each other for engaging spaced points on the circumference of said bearings.

7. The apparatus of claim 3 wherein said vertical support is secured to said base by a stud and nut assembly.

8. The apparatus of claim 3 wherein said stacking rod is threaded along its entire length and said retaining means is threadably attachable to said stacking rod.

9. The apparatus of claim 3 wherein said stacking rod is threaded into said base member such that the stacking rod is centrally located on said base relative to said vertical support member.

10. The apparatus of claim 3 wherein said retaining means is comprised of a nut and a retaining plate.

11. The method of applying grease to bearings having inner and outer races comprising the steps of: stacking a plurality of identical bearings in axially aligned abutting contact with each other on a base having a grease path with a discharge port, clamping said stack of bearings against said base with the space between said inner and outer races in alignment with said discharge port, and introducing grease under pressure into said grease path and through said bearings in said stack.

* * * * *